United States Patent
Pautis et al.

(10) Patent No.: US 10,232,930 B2
(45) Date of Patent: Mar. 19, 2019

(54) NACELLE FOR AN AIRCRAFT ENGINE ASSEMBLY COMPRISING AT LEAST ONE JOINTED NACELLE COWLING AT ITS FRONT END

(71) Applicant: AIRBUS OPERATIONS (S.A.S.), Toulouse (FR)

(72) Inventors: Olivier Pautis, Merville (FR); Jérôme Colmagro, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 249 days.

(21) Appl. No.: 15/067,854

(22) Filed: Mar. 11, 2016

(65) Prior Publication Data

US 2016/0264233 A1    Sep. 15, 2016

(30) Foreign Application Priority Data

Mar. 12, 2015 (FR) .................................. 15 52046

(51) Int. Cl.

| | |
|---|---|
| *F01D 25/24* | (2006.01) |
| *B64C 11/48* | (2006.01) |
| *B64C 7/02* | (2006.01) |
| *B64D 29/08* | (2006.01) |
| *F02K 3/02* | (2006.01) |
| *B64D 27/00* | (2006.01) |

(52) U.S. Cl.
CPC .............. *B64C 7/02* (2013.01); *B64C 11/48* (2013.01); *B64D 29/08* (2013.01); *F01D 25/24* (2013.01); *F02K 3/025* (2013.01); *B64D 2027/005* (2013.01); *F05D 2220/32* (2013.01); *Y02T 50/66* (2013.01)

(58) Field of Classification Search
CPC ........... B64C 7/02; B64C 11/48; B64D 29/06; B64D 29/08; B64D 2027/005; F01D 25/24; F05D 2220/32; Y02T 50/66
See application file for complete search history.

(56) References Cited

U.S. PATENT DOCUMENTS

| | | | |
|---|---|---|---|
| 2,421,689 A * | 6/1947 | Elkin .................... | B64D 29/08 123/41.7 |
| 6,837,459 B2 | 1/2005 | Gonidec et al. | |
| 7,703,716 B2 | 4/2010 | Bulin | |
| | | (Continued) | |

FOREIGN PATENT DOCUMENTS

| | | | |
|---|---|---|---|
| FR | 2 812 911 A1 | 2/2002 | |
| FR | 2 897 339 A1 | 8/2007 | |
| | (Continued) | | |

OTHER PUBLICATIONS

French Search Report for Application No. 1552046 dated Jan. 14, 2016.

*Primary Examiner* — Jesse Prager
(74) *Attorney, Agent, or Firm* — Jenkins, Wilson, Taylor & Hunt, P.A.

(57) ABSTRACT

In order to reduce the risks of movable nacelle cowlings opening, the invention provides a nacelle for an aircraft engine assembly comprising a fixed nacelle structure as well as at least one jointed movable cowling on the fixed structure, the cowling being jointed at its front end on the fixed structure so that, upon closing the movable cowling, a rear end of this cowling moves towards the rear and radially towards the inside.

13 Claims, 5 Drawing Sheets

(56) References Cited

U.S. PATENT DOCUMENTS

| | | | |
|---|---|---|---|
| 9,091,207 B2 | 7/2015 | Chanez et al. | |
| 2004/0238687 A1* | 12/2004 | Jones | B64D 29/08 244/62 |
| 2008/0253881 A1* | 10/2008 | Richards | F02C 7/052 415/145 |
| 2008/0315034 A1 | 12/2008 | Vauchel et al. | |
| 2010/0044502 A1* | 2/2010 | Cazals | B64D 27/20 244/54 |
| 2011/0297787 A1* | 12/2011 | Guillaume | B64D 29/06 244/129.4 |

FOREIGN PATENT DOCUMENTS

| | | |
|---|---|---|
| FR | 2 901 244 A1 | 11/2007 |
| FR | 2 915 527 A1 | 10/2008 |
| WO | WO 2011/045373 A1 | 4/2011 |

\* cited by examiner

NACELLE FOR AN AIRCRAFT ENGINE ASSEMBLY COMPRISING AT LEAST ONE JOINTED NACELLE COWLING AT ITS FRONT END

TECHNICAL FIELD

The present invention relates to an aircraft engine assembly comprising a turbine engine and also a nacelle arranged about the turbine engine.

More specifically, the invention relates to the installation of movable nacelle cowlings allowing access to the engine assembly equipment so that maintenance work can be carried out.

The invention applies to turbine engines comprising a pair of counter-rotating open propellers, said turbine engines likewise being referred to as "open rotor" or also "CROR" (Counter-Rotating Open Rotor). More precisely, the invention applies to pusher-type turbine engines with an open rotor configuration, in which the receiver is arranged at the rear in respect of the gas generator.

BACKGROUND

In aircraft, each turbine engine is usually surrounded by a nacelle which has an essentially aerodynamic function. The nacelle is traditionally equipped with movable cowlings which allow access to equipment arranged about a housing of the turbine engine when said movable cowlings are in the open position. Access to this equipment allows ground maintenance operations to be carried out.

Movable cowlings are usually jointed along axes which are substantially parallel to the longitudinal axis of the turbine engine. They are therefore jointed at their upper end and their free end is secured with locks in the closed position. When a nacelle cowling is opened, its free end moves away radially from the longitudinal axis of the turbine engine, whereas when the cowling is closed, its free end moves towards this same longitudinal axis radially.

This conventional solution provides satisfaction overall. Nevertheless, it may be wise to improve it, particularly in order to reduce the risk of the cowlings opening in flight under the effects of external aerodynamic loads acting on said cowlings. This need is essentially evident when the turbine engine is the pusher, open-rotor type, in other words where the receiver is arranged at the rear. In fact, should a movable cowling open in flight, it is liable to become detached and therefore strike the blades of the counter-rotating propellers situated further back. This risk of damage to the blades likewise exists in respect of debris liable to become detached from the engine assembly following the opening of the movable cowlings.

SUMMARY

The aim of the invention is therefore to propose an aircraft assembly which solves at least some of the problems referred to above found in the solutions in the prior art.

To achieve this, the object of this invention is an engine assembly exhibiting the technical characteristics of Claim 1.

The installation of the movable nacelle cowling marks a departure from conventional solutions and allows the risk of the cowling being opened in flight to be limited. In fact, thanks to the jointing of the mobile cowling at its front end, the external aerodynamic loads acting on this cowling advantageously tend to force said cowling into its closed position. Moreover, the reduction in the risks of the cowling opening brings with it a reduction in the risk of said cowling becoming detached, as well as a reduction in the risk of debris being projected which is liable to become detached from the engine assembly following the opening of a movable nacelle cowling. This advantage is particularly relevant to the turbine engines to which the present invention relates, the open-rotor, pusher type, as it reduces the risk of damage to the blades of the open counter-rotating propeller blades. The invention preferably exhibits at least one of the following optional characteristics, taken either in isolation or combined.

The nacelle comprises a number of movable cowlings of between two and four, said movable cowlings being distributed about a longitudinal axis of the nacelle and following one another in a circumferential direction of the nacelle, each of said movable cowlings being jointed at its front end on the fixed structure so that, upon closing the movable cowling, a rear end of this cowling moves towards the rear and radially towards the inside.

Said movable cowling is jointed at its front end along a joint axis in a transverse plane of the nacelle. Nevertheless, the joint axis could be inclined in respect of this transverse plane without exceeding the scope of the invention.

The joint axis is preferably oriented substantially tangentially to the nacelle.

Said movable cowling exhibits an axial length of between 30 and 90% of the total axial length of the nacelle.

Said movable cowling preferably covers at least part of said gas generator.

Finally, the object of the invention is an aircraft comprising at least one engine assembly of this kind, said assembly preferably being added to the rear part of the fuselage. Alternatively, it may be added to a wing of the aircraft or to a portion of its fuselage closer to the front, without exceeding the scope of the invention.

Other advantages and characteristics of the invention will appear in the non-limiting, detailed description below.

BRIEF DESCRIPTION OF THE DRAWINGS

This description will be provided in relation to the attached drawings among which.

DETAILED DESCRIPTION

Figure 1:
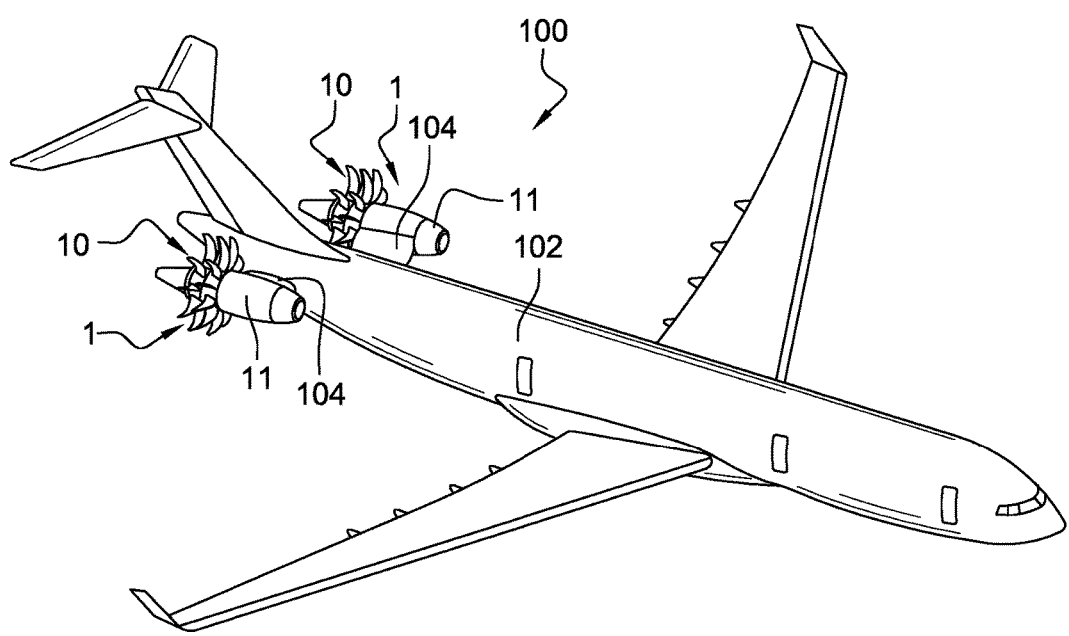
FIG. 1 represents a schematic perspective view of an aircraft comprising engine assemblies according to the invention.

Firstly with reference to FIG. 1, this represents an aircraft 100 comprising one or a plurality of engine assemblies 1 according to the invention. More precisely, the aircraft comprises two assemblies 1, each one added to the rear portion of a fuselage 102 of this aircraft. The fixing of each engine assembly 1 to the fuselage 102 is realized by conventional means with the help of a mounting pylon 104 or EMS (Engine Mounting Structure).

Each engine assembly 1 comprises a turbine engine 10 and a nacelle 11 surrounding part of the turbine engine.

Figure 2:
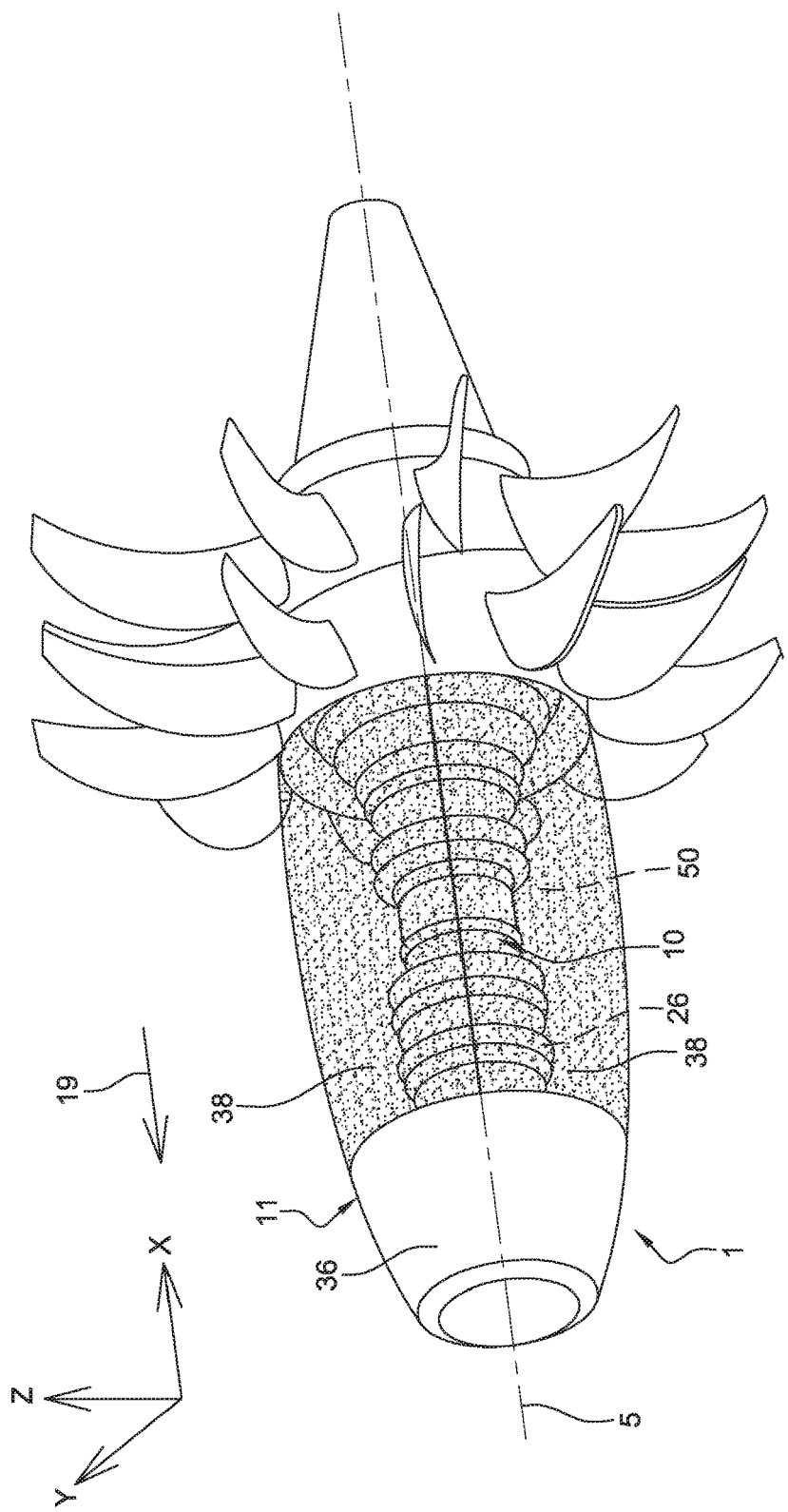
FIG. 2 represents a perspective view of an engine assembly according to a first preferred embodiment of the invention.

As will be described with reference to FIGS. 2 and 3, the turbine engine 10 is of the open-rotor type in pusher mode, in other words it comprises a gas generator as well as a receiver with a pair of open, counter-rotating propellers, said receiver being arranged at the rear relative to the gas generator.

Throughout the following description, by convention the direction X corresponds to the longitudinal direction of the engine assembly 1 which is likewise akin to the longitudinal direction of the turbine engine 10 and of this assembly 1. This direction X is parallel to a longitudinal axis 5 of the turbine engine 10. On the other hand, the direction Y corresponds to the direction oriented transversely in respect of the engine assembly 1 and is likewise akin to the transverse direction of the turbine engine 10, whereas the direction Z corresponds to the vertical direction or the height. These three directions X, Y and Z are perpendicular to one another and form a direct trihedron.

On the other hand, the terms "front" and "rear" should be understood in relation to a forward-moving direction of the aircraft found following the thrust generated by the turbine engines 10, this forward-moving direction being represented schematically by the arrow 19.

Overall, the turbine engine 10 comprises from front to rear a low-pressure compressor 9, a high-pressure compressor 12, a combustion chamber 14, a high-pressure turbine 16 and a low-pressure turbine 18. The low-pressure compressor 9 and the low-pressure turbine 18 are linked by a low-pressure shaft 20, whereas the high-pressure compressor 12 and the high-pressure turbine 16 are linked by a high-pressure shaft 22 to form together a gas generator 24. All these components are surrounded by an engine housing 26 centered on the axis 5.

Downstream of the low-pressure turbine 18, a receiver 30 of the type with a pair of counter-rotating propellers is provided, namely a front propeller 32 and a rear propeller 34. Although this has not been shown, the propellers are started by a free power turbine or by an epicyclic gear train reducer.

At the front of the receiver 30, the turbine engine 10 is surrounded by the nacelle 11 which comprises an air intake 36 extended towards the rear by the movable cowlings 38, the installation whereof is specific to the invention.

More generally, the nacelle 11 comprises a fixed structure 42 of which the air intake 36 is part. The fixed structure 42 likewise comprises an air intake 36 support 40 connecting the latter to the engine housing 26, to the right of or proximate to the low-pressure compressor 9. This support 40 takes the shape of an annular structure, for example, centred on the axis 5, which structure may be a frame referred to as a "strong frame".

The movable cowlings 38 are peculiar in that they are jointed at their front end 38a on the fixed structure 42, for example on the annular structure 40. The joint is made with the help of conventional hinges 46 or similar components.

Each movable cowling 38 extends here from the air intake 36 to the receiver 30, in other words along an axial length "La" of between 30 and 90% of the total axial length "Lt" of the nacelle and, more preferably, close to 70% of this total axial length. Each cowling 38 therefore covers the gas generator 24, but likewise preferably all the components of the turbine engine contained in the engine housing 26. The movable cowlings 38 may therefore extend downstream as far as the receiver 30, or else one or a plurality of fixed cowlings guarantee the aerodynamic junction between the movable cowlings 38 and the receiver 30 itself, in the direction X.

In other words, the movable cowlings 38 extend in the direction X from their air intake 36 towards the receiver 30 over the entire aerodynamic surface contained between these two components 36, 30, in other words, over the entire axial length and over the entire circumference of this aerodynamic surface.

Alternatively, the movable cowlings 38 extend in the direction X from the air intake 36 towards the receiver 30, but only over part of the aerodynamic surface included between these two components 36, 30. In other words, they extend over part of the length and/or part of the circumference of this aerodynamic surface. The complementary surface not formed by the movable cowlings 38 is then guaranteed by the fixed cowlings positioned either between the movable cowlings 38 and the receiver structure 30 to ensure aerodynamic continuity in the direction X or between two movable cowlings 38 to ensure aerodynamic continuity in the circumferential direction.

Moreover, rather than only providing a single annular row of movable cowlings 38, it would be possible, for example, for two successive annular rows to be provided in the direction X. In other words, this divides up the movable cowlings 38 in this direction X.

An annular space 50 is defined between the engine housing 26 and the internal surface of the movable cowlings 38. This space 50 is dedicated to housing equipment, shown in schematic form under reference number 52 in FIG. 3. The opening of the cowlings 38 allows access to be gained to this equipment to allow ground maintenance to be carried out on it. Outside maintenance operations, each movable cowling 38 is closed via its rear end 38b by lock 39 intended, for example, to cooperate with the rear part of the engine housing 26. Here, once again, such locks 39 are conventional and will not be described further.

Figure 3:
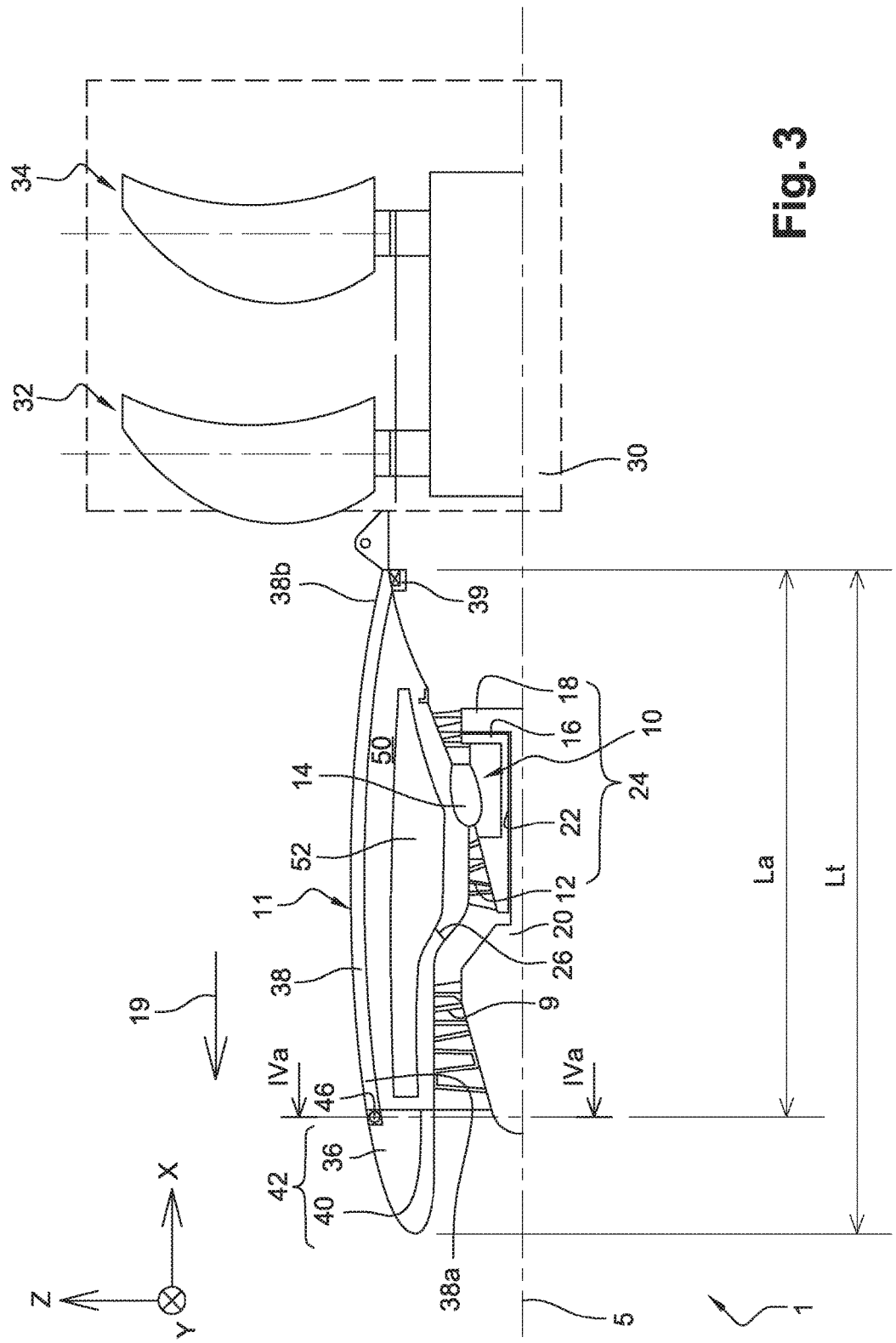
FIG. 3 represents a longitudinal sectional view of the engine assembly shown in FIG. 2.
Figure 4A:
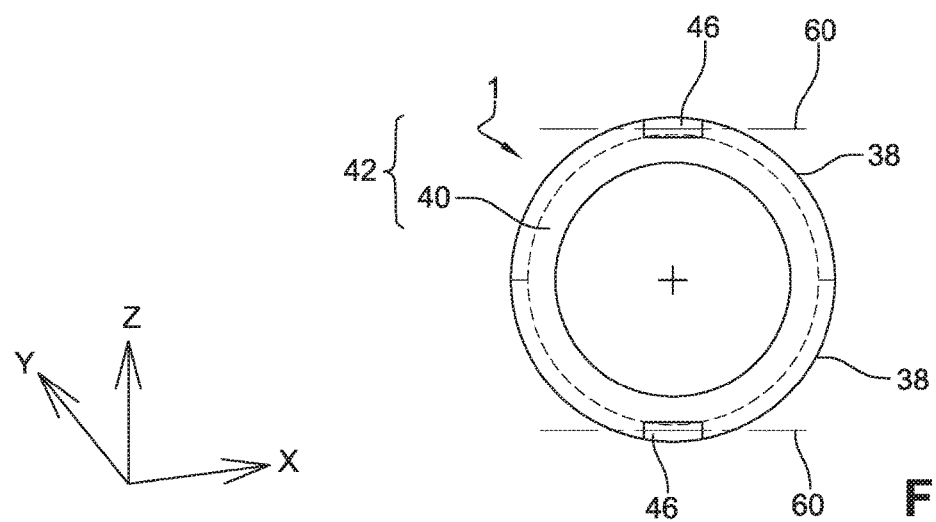
FIG. 4a represents a transverse sectional view of the engine assembly along the line IVa-IVa in FIG. 3.
Figure 4:
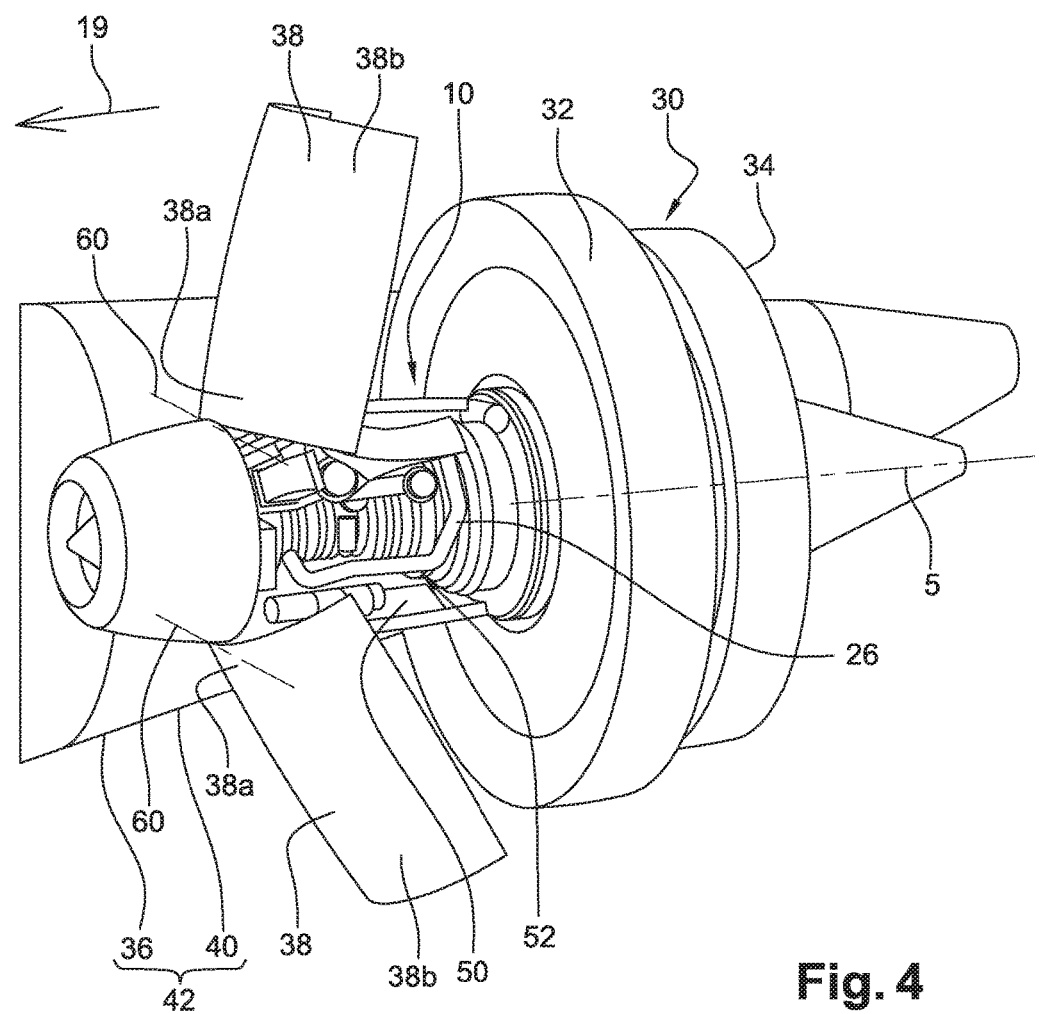
FIG. 4 is a similar view to that in FIG. 2 with the movable nacelle cowlings depicted in the open position.

With reference to FIGS. 3, 4 and 4a, it is noted that in this first preferred embodiment two movable cowlings 38 are provided, each one extending over an angular sector of around 180°. The two cowlings 38, in the form of half-shells, are arranged so as to form an upper and a lower cowling, the interface between them being in a median plane XY of the assembly 1. It is noted that even if this is not provided for in the described embodiment, the fixed structure of the nacelle could comprise support components extending longitudinally in the direction of the receiver 30 on which the cowlings 38 could rest in the closed position.

Each movable cowling 38 is therefore jointed at its front end 38a, such that when it is closed a rear end 38b of this cowling moves towards the rear and radially towards the inside. To achieve this, it is preferably made in such a manner that the joint axis 60 of each cowling 38 is in the transverse sectional plane in FIG. 4a with an orientation tangential to the nacelle.

In this preferred configuration, in order to move from the opened position in FIG. 4 to the closed position in FIG. 3 and vice versa, each movable cowling 38 is displaced in a longitudinal plane XZ. Other displacement directions could of course be envisaged, notably non-longitudinal directions, but always such that during closure the rear end 38b of the cowling is moved towards the rear and radially towards the inside. This makes it possible to ensure that the external aerodynamic loads acting on the cowling force said cowling towards its closed position, thereby reducing the risk of in-flight opening and detachment.

Figure 5A:
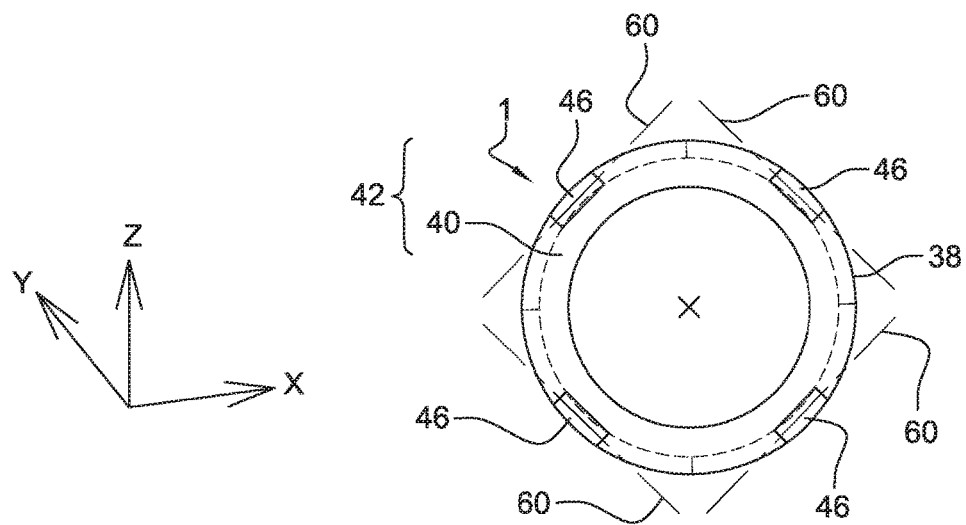
FIG. 5a represents a transverse sectional view of the engine assembly according to the second preferred embodiment.
Figure 5:
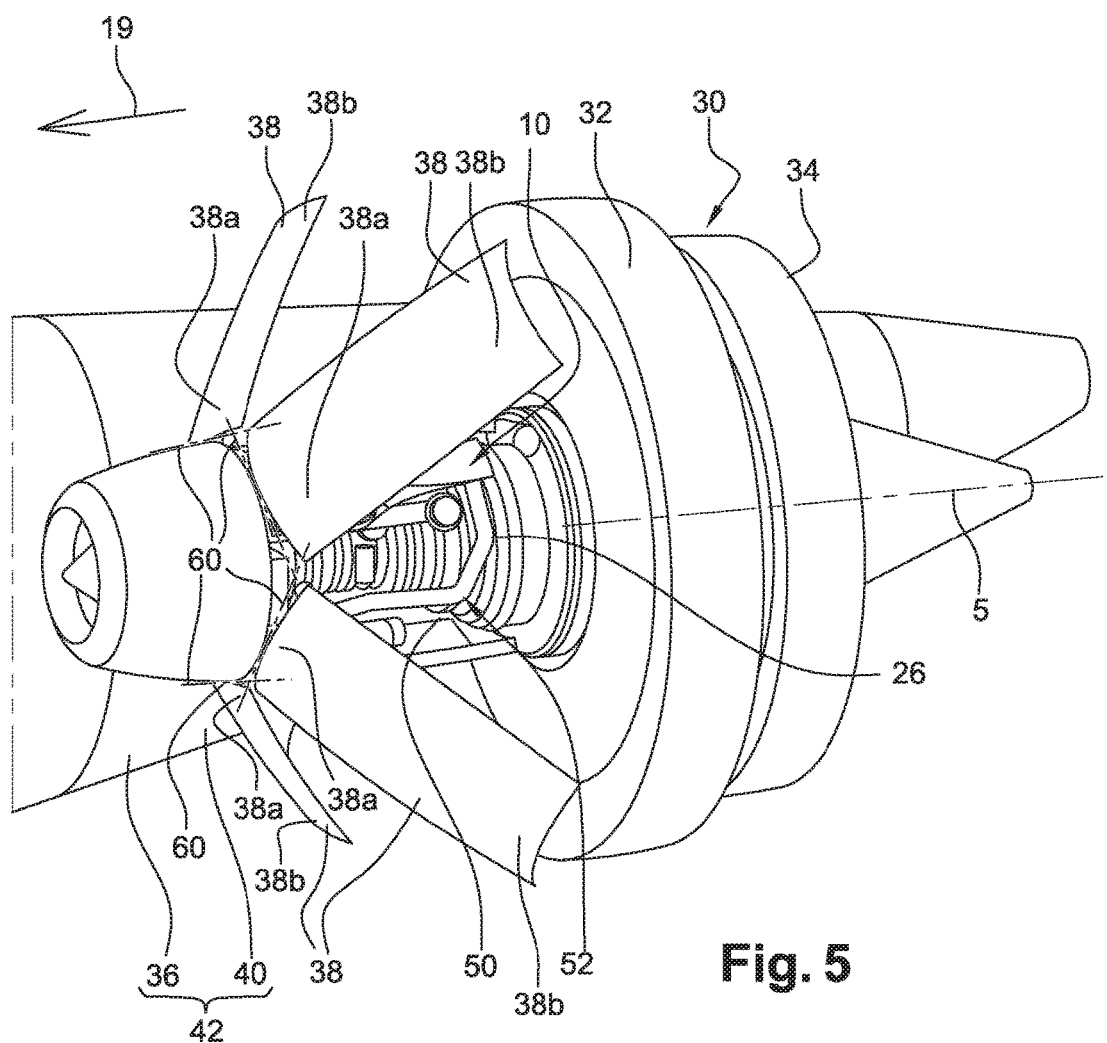
FIG. 5 represents a similar view to that in FIG. 4, with the assembly being presented according to a second preferred embodiment of the invention.

In the second embodiment shown in FIGS. 5 and 5a, the only change is the number of movable cowlings 38 in the annular row, said cowlings numbering four in this case, each one extending over an angular sector in the order of 90°. In this configuration, in order to move from the open position in FIG. 5 into the closed position in FIG. 5a and vice versa, each movable cowling 38 is displaced in a longitudinal plane corresponding to a median plane of the respective cowling.

Other embodiments may be envisaged with a different number of movable cowlings, for example eight cowlings.

The person skilled in the art can, of course, introduce various modifications to the aircraft engine assemblies 1 that have just been described, simply by way of non-limiting examples. In particular, the invention may be applied to other types of aircraft turbine engines such as double-flow turbojet engines, also referred to as turbofans. In this particular case, the cowlings involved are preferably airbreathing cowlings arranged axially between the air input and the thrust reverser cowlings.

The invention claimed is:

1. An aircraft comprising at least one aircraft engine assembly, the at least one aircraft engine assembly comprising:
   a turbine engine comprising:
      an engine housing;
      a gas generator; and
      a receiver with a pair of open, counter-rotating propellers, wherein the receiver is arranged at a rear of the gas generator; and
   a nacelle arranged about the turbine engine, the nacelle comprising:
      a fixed nacelle structure;
      an air intake located at a front of the nacelle in a direction of a longitudinal axis of the assembly; and
      one or more movable cowlings jointed on the fixed nacelle structure and extending, in the direction of the longitudinal axis of the assembly, to cover an entire length, in the direction of the longitudinal axis of the assembly, between the air intake and a front edge of the receiver,
   wherein the one or more movable cowlings are jointed at a front end thereof, respectively, on the fixed nacelle structure so that, upon closing one of the one or more movable cowlings, a rear end thereof moves rearwardly and radially inside,
   wherein the at least one aircraft engine assembly is mounted on a rear portion of a fuselage of an aircraft.

2. The aircraft according to claim 1, wherein the one or more movable cowlings are arranged to occupy an entire aerodynamic surface between the air intake and the receiver.

3. The aircraft according to claim 1, wherein the one or more movable cowlings are jointed at the front end thereof on the fixed nacelle structure along a joint axis in a transverse plane of the nacelle.

4. The aircraft according to claim 1, wherein the one or more movable cowlings are jointed at the front end thereof on the fixed nacelle structure along a joint axis oriented tangentially to the nacelle.

5. The aircraft according to claim 1, wherein the one or more movable cowlings have an axial length that is between and including 30% and 90% of a total axial length of the nacelle.

6. The aircraft according to claim 1, wherein the one or more movable cowlings each cover at least a part of the gas generator.

7. The aircraft according to claim 1, wherein the one or more movable cowlings are arranged to cover an entire circumference of an aerodynamic surface between the air intake and the receiver.

8. The aircraft of claim 1, wherein the one or more movable cowlings comprise a plurality of movable cowlings.

9. The aircraft according to claim 8, wherein the plurality of movable cowlings comprise at least two movable cowlings, which are distributed about the longitudinal axis of the assembly and follow one another in a circumferential direction of the nacelle.

10. The aircraft according to claim 8, wherein the plurality of movable cowlings comprise at least four movable cowlings, which are distributed about the longitudinal axis of the assembly and follow one another in a circumferential direction of the nacelle.

11. The aircraft according to claim 8, wherein the plurality of movable cowlings comprise an upper cowling and a lower cowling, wherein an interface between the upper and lower cowlings is located in a plane that is perpendicular to a height of the assembly.

12. The aircraft according to claim 1, comprising an annular space defined between the engine housing and an internal surface of the one or more movable cowlings.

13. The aircraft according to claim 12, wherein the annular space is configured for housing equipment for the engine assembly, wherein movement of at least one of the one or more movable cowlings to an open position allows ground maintenance to be performed on the equipment for the engine assembly.

* * * * *